J. WHITTEMORE.
SHEET GLASS DRAWING APPARATUS.
APPLICATION FILED NOV. 6, 1919.

1,362,378. Patented Dec. 14, 1920.
2 SHEETS—SHEET 1.

Inventor
James Whittemore

By
Attorneys

J. WHITTEMORE.
HE... A... AWING APPARATUS.
... FILED NOV. 6 ...

1,362,368.

Patented Dec. 14, 1920.
2 SHEETS-SHEET 2.

Inventor
James Whittemore

By ...
Attorneys

UNITED STATES PATENT OFFICE.

JAMES WHITTEMORE, OF DETROIT, MICHIGAN, ASSIGNOR TO THE LIBBEY-OWENS SHEET GLASS COMPANY, OF TOLEDO, OHIO, A CORPORATION OF OHIO.

SHEET-GLASS-DRAWING APPARATUS.

1,362,378.   Specification of Letters Patent.   Patented Dec. 14, 1920.

Application filed November 6, 1919. Serial No. 336,144.

*To all whom it may concern:*

Be it known that I, JAMES WHITTEMORE, a citizen of the United States of America, residing at Detroit, in the county of Wayne and State of Michigan, have invented certain new and useful Improvements in Sheet-Glass-Drawing Apparatus, of which the following is a specification, reference being had therein to the accompanying drawings.

This invention relates to a sheet glass drawing apparatus in which the glass is adapted to flow freely to a lateral outlet and be drawn therefrom over a traveling, cooled, metal drawing lip; and further, in the construction, arrangement and combination of the various parts, as more fully hereinafter described and set forth in the claims.

Figure 1:
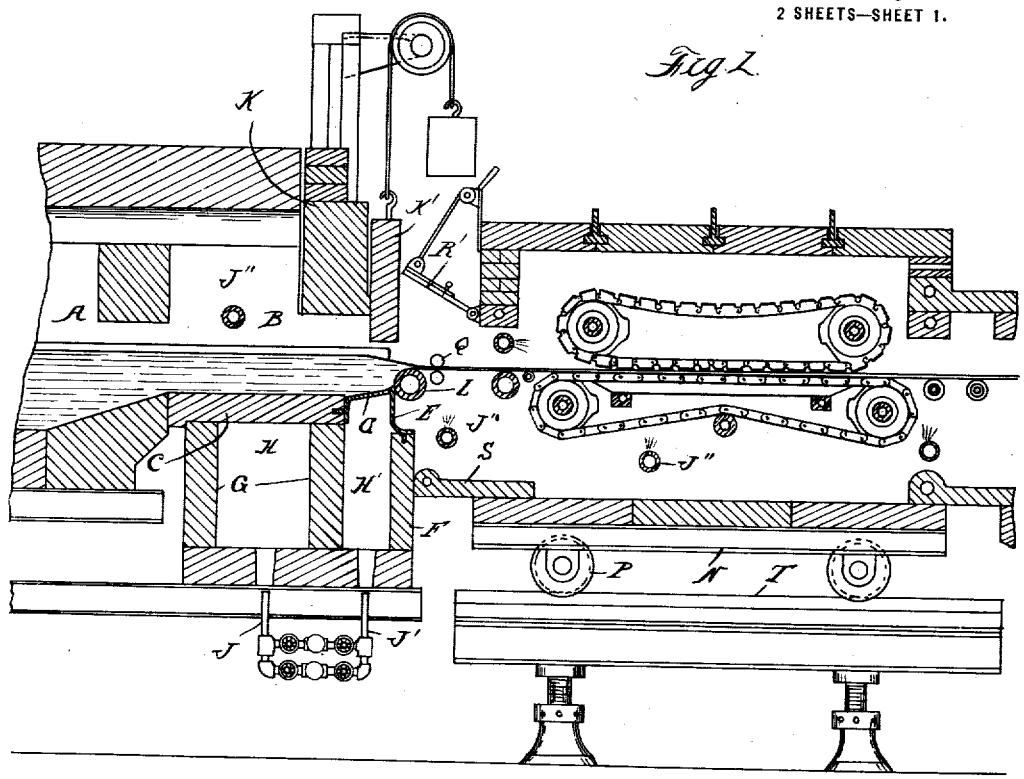
Figure 1 is a vertical, central, longitudinal section showing the glass tank and the drawing apparatus embodying one form of my invention.

A represents the refining chamber of a continuous glass tank adapted to be fed with molten glass from such continuous tank, with any suitable means for maintaining the level of the glass in the refining chamber or to close off the supply. This construction may be of any of the well-known devices and forms no part of my invention. B is the drawing chamber, the bottom of the main portion of which is formed by a substantially U-shaped tile, C. The bottom of the outer end of this chamber is preferably formed by an inclined metal plate D, which, as shown, has a vertical portion E, resting upon the front walls F. There are proper supporting walls G, for the tile C, and heating chambers H and H', supplied from burners J J', are formed beneath the tile C and plate D. K is a suitable jack-arch over the outer end of the chamber B; and K' is an adjustable gate, or shear-cake, which may be raised and lowered to control the temperature of the glass on the slab C and plate D. This temperature is also controlled, more or less, by the burners J, J'

At the outer end of the drawing chamber and below the level of the glass therein I arrange a traveling drawing lip, which I have shown as a roller, L. This roller is preferably hollow, and any suitable means for cooling it may be provided; as, by passing water through it, playing air or steam through it, or, a combination of air and steam; according to the temperature desired in the roller.

I have shown this roller as supported in suitable bearings in a vertically adjustable bracket L', with means for adjusting it comprising the screw M, which may be provided with a suitable hand-wheel or other adjusting means.

This roller at its end has a worm wheel, $a$, which meshes with the worn, $a'$, on a horizontal shaft, $b$; connecting through the telescopic connection, $c$, with the drive shaft, $d$, carried on the side of the frame N, which incloses the drawing mechanism. This shaft $b$ is driven from a motor, N', also on the drawing mechanism frame, the driving connection being through suitable gearing O, as shown. Proper universal joints are provided in these shafts, as shown at $e$, to permit of the raising and lowering of the roller L and its proper driving at any point of adjustment.

The glass drawing mechanism, which is supported on the frame N, I have shown as supported on wheels P running on a suitable track, so that it may be adjusted to and from the glass supply. This drawing mechanism is of the well-known type used in connection with the Colburn processes, for instance as shown in United States Letters Patent No. 1,160,692, and need not be described herein, as its construction and operation are well understood. I have shown it as provided with suitable gear mechanism so that it may be driven from the motor N'.

Figure 2:
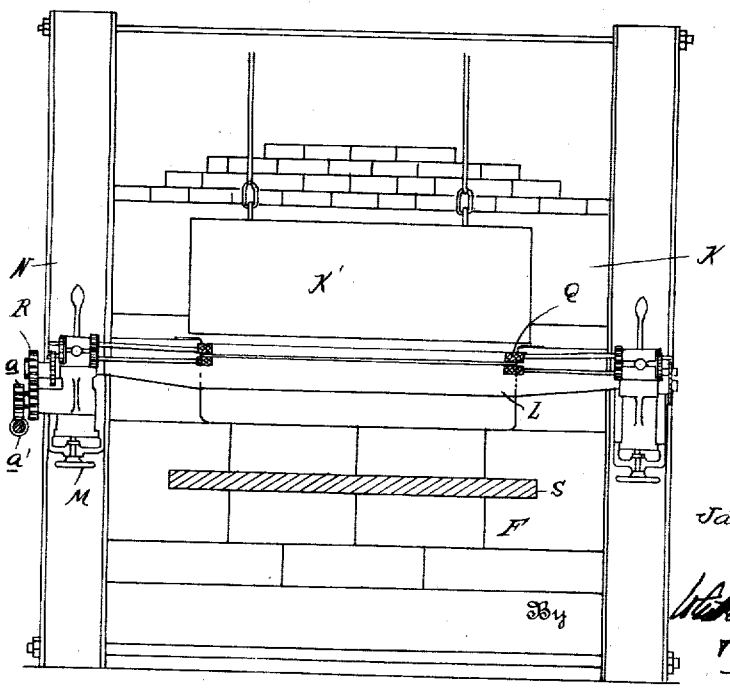
Fig. 2 is a front elevation of the tank, showing the rotary drawing lip in position, also the edge rolls and the actuating mechanism therefor.
Figure 3:
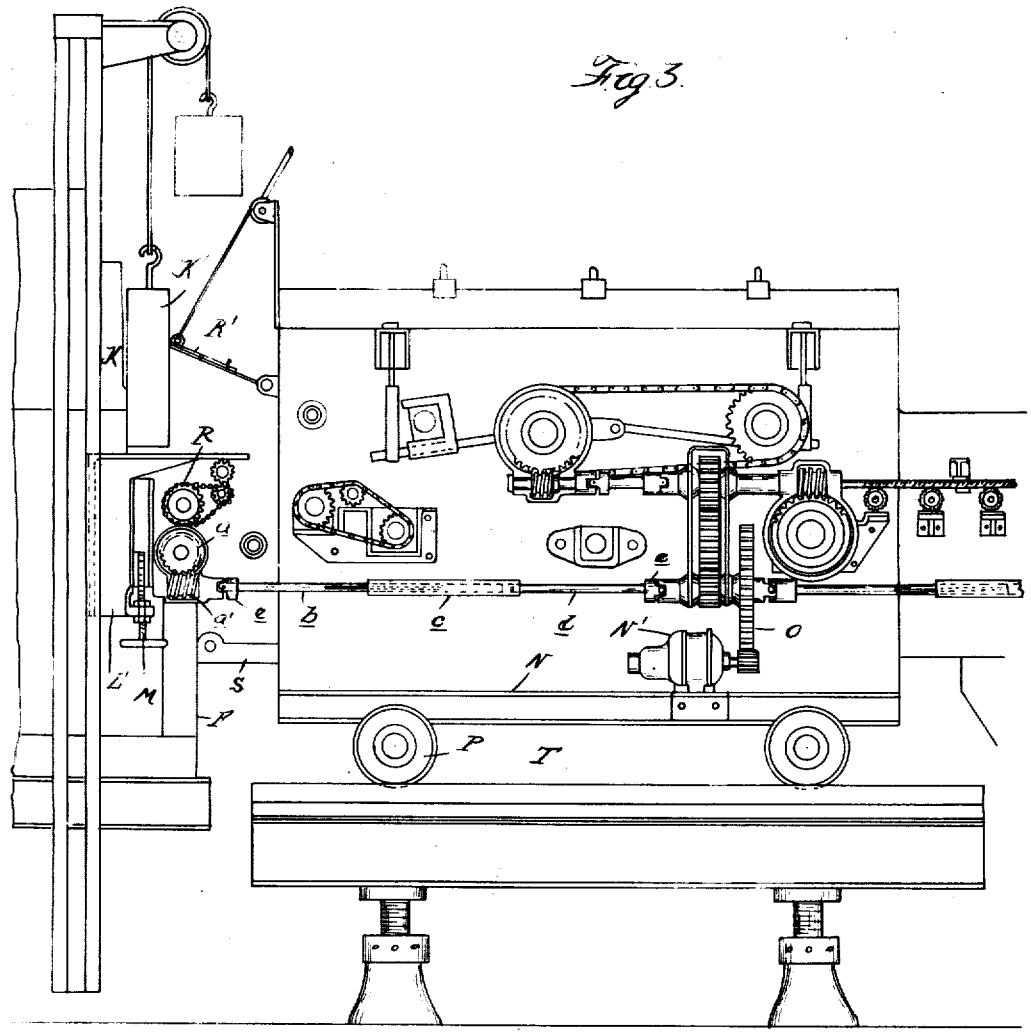
Fig. 3 is a side elevation of the discharge end of the glass tank and the drawing mechanism.

The edge rolls, or width-maintaining rolls, commonly used in connection with the Colburn method of drawing glass and shown in the above-mentioned Patent No. 1,160,692, I have shown herein at Q; which rolls are driven from a gear connection R (Fig. 2), from the shaft of the roll L. This forms no part of my present invention and I do not deem it necessary to describe the same in detail.

Above the drawing point, I have shown the adjustable damper, R', to assist in controlling the temperature at the drawing point. Below the drawing point I have shown a tile, S, secured to the wall F and projecting over the floor of the casing inclosing the drawing mechanism, to prevent the ingress of air at that point; so that the glass may not be too rapidly cooled in the drawing mechanism.

Suitable burners J″ are provided for maintaining the temperature of the glass in the chambers A and B, and also in the chamber in which the drawing mechanism is located.

The rails T on which the wheels P operate may be adjusted vertically by suitable jacks, so that the drawing mechanism may be alined with the roll L at any point of adjustment.

The operation of the device is as follows: The molten glass from the continuous tank flows into the refining tank or chamber A and over the slab or tile C and the plate D and up against the face of the roller L. The level of the glass is preferably maintained above the level of the roller L, as shown in Fig. 1; and after the bait has been attached to the glass and the sheet started, in the well-known manner of starting sheet glass drawing, and the bait broken off, the glass will be drawn from that portion of the mass in the drawing chamber B, which is above the upper surface of the roller L, and upon the drawing table, in sheet form; and it will be delivered from the drawing table into a suitable leer through which it may be passed in a continuous sheet.

During this drawing operation, the roller L will be rotated, preferably at the speed at which the sheet is drawn, so that this roller will form, in effect, a traveling drawing lip over which the glass will be drawn in sheet form from the lateral outlet of the tank.

It has been found in drawing glass from a stationary lip or tile, that lines or marks are apt to be produced upon the surface, due to several causes: one, the unevenness of the surface from which it is drawn; another, the formation of cooler masses of glass at the edge of the lip, due to the presence of the cool air at that point. A further cause is the so-called "dog-metal" which is apt to form near the drawing point—referred to commonly as devitrification of the glass By the construction shown in my apparatus, molten glass of considerable thickness can flow up to the roller and over the top thereof, and if a polished roller of nichrome steel is employed, a perfectly smooth surface may be imparted to the under surface of the sheet drawn.

By the providing of suitable heat beneath the glass at the point which it contacts with the roller, the formation of cold glass at that point will be avoided; also the formation of "dog-metal,"—and the formation of "dog-metal" is further prevented by the use of the inclined plate D, which may, and preferably should, in practice, extend from the top of the tile C to the middle or above the middle of the roll L; so that the entire body of the glass back of the roll will be drawn over the upper surface of the roll. This is not essential, however, if proper heat is maintained beneath the plate D.

What I claim as my invention is:

1. In a sheet glass drawing apparatus, the combination of a tank having a free lateral outlet through which the glass may flow and a traveling, cooled metal drawing lip below the level of the glass, over which the glass flowing out from the tank may be drawn.

2. In a glass drawing apparatus the combination of a tank having a free lateral outlet through which the glass may flow, of a cooled roller at said outlet and below the level of the glass, and drawing means beyond the outlet for drawing a sheet of glass from the glass above the roller.

3. In a sheet glass drawing apparatus, the combination of a tank having a free lateral outlet through which the glass may flow, of a cooled, driven roller at the outer end below the level of the glass, and drawing means beyond the outlet for drawing a sheet of glass from the glass above the roller.

4. In a sheet glass drawing apparatus, the combination of a tank having a lateral outlet through which the glass may flow, a traveling cooled metal drawing lip below the level of the glass, and a heater for the glass, in the tank, applied to the glass behind said drawing lip to prevent the formation of "dog metal."

5. In a sheet glass drawing apparatus, the combination of a tank having a lateral outlet through which the glass may flow, of a slab at the discharge end of said outlet, means for heating said slab, and a metallic, driven roller adjacent said slab and across said outlet, cooled to act as a dam for the lower portion of the glass on the slab, the top of the roller being beneath the level of the glass, and means for drawing the glass from the slab over the roller.

6. In a sheet glass drawing apparatus, the combination of a tank having a lateral outlet through which the glass may flow, a heated slab at the discharge end of the outlet, inclined upwardly to the discharge point, and a driven roller at the outlet end of the slab, having its top below the level of the glass on the slab.

In testimony whereof I affix my signature.

JAMES WHITTEMORE,